(12) United States Patent
Wang et al.

(10) Patent No.: US 11,852,912 B2
(45) Date of Patent: Dec. 26, 2023

(54) COLOR FILTER SUBSTRATE, METHOD FOR MANUFACTURING THE SAME, AND DISPLAY PANEL

(71) Applicant: HKC Corporation Limited, Shenzhen (CN)

(72) Inventors: Jie Wang, Shenzhen (CN); Fulin Deng, Shenzhen (CN); Rong Tang, Shenzhen (CN); Jianying Zhang, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 7 days.

(21) Appl. No.: 17/908,537

(22) PCT Filed: Dec. 30, 2021

(86) PCT No.: PCT/CN2021/142895
§ 371 (c)(1),
(2) Date: Sep. 1, 2022

(87) PCT Pub. No.: WO2022/166488
PCT Pub. Date: Aug. 11, 2022

(65) Prior Publication Data
US 2023/0119455 A1     Apr. 20, 2023

(30) Foreign Application Priority Data
Feb. 5, 2021 (CN) .......................... 202110159668.0

(51) Int. Cl.
*G02F 1/1335* (2006.01)
(52) U.S. Cl.
CPC .. *G02F 1/133512* (2013.01); *G02F 1/133516* (2013.01); *G02F 1/133553* (2013.01)

(58) Field of Classification Search
None
See application file for complete search history.

(56) References Cited

U.S. PATENT DOCUMENTS

| | | | | |
|---|---|---|---|---|
| 2010/0053533 A1* | 3/2010 | Fan | ...................... | G02F 1/1341 349/189 |
| 2016/0041413 A1* | 2/2016 | Nishino | ................ | G02F 1/1368 349/42 |
| 2020/0301190 A1 | 9/2020 | Ai | | |

FOREIGN PATENT DOCUMENTS

| | | |
|---|---|---|
| CN | 103926739 A | 7/2014 |
| CN | 103926742 A | 7/2014 |
| CN | 106154632 A | 11/2016 |
| CN | 106226944 A | 12/2016 |

(Continued)

OTHER PUBLICATIONS

Shuangkui Cui, the International Searching Authority written comments, dated Apr. 2022, CN.

(Continued)

*Primary Examiner* — Phu Vu

(57) ABSTRACT

A color filter substrate is disclosed, including a substrate, a black matrix layer, a first groove, and a reflective layer. The substrate includes a display area and a non-display area disposed surrounding the display area. The black matrix layer is arranged on the substrate, and includes a first black matrix layer arranged in the display area and a second black matrix layer formed in the non-display area. The first groove is defined in the second black matrix layer, and the reflective layer covers the first groove.

20 Claims, 6 Drawing Sheets

(56) References Cited

FOREIGN PATENT DOCUMENTS

| CN | 107589588 A | 1/2018 |
| CN | 111025735 A | 4/2020 |
| CN | 112882274 A | 6/2021 |

OTHER PUBLICATIONS

Shuangkui Cui, the International Search Report, dated Apr. 2022, CN.

\* cited by examiner

COLOR FILTER SUBSTRATE, METHOD FOR MANUFACTURING THE SAME, AND DISPLAY PANEL

CROSS-REFERENCE TO RELATED APPLICATIONS

This application is a United States national stage application of co-pending International Patent Application Number PCT/CN2021/142895, filed Dec. 30, 2021, which claims the benefit and priority of Chinese patent application number 2021101596680, entitled "Color Filter Substrate, Method for Manufacturing the Same, and Display Panel" and filed with China National Intellectual Property Administration on Feb. 5, 2021, the entire contents of which are incorporated herein by reference.

TECHNICAL FIELD

This application relates to the field of display technology, and more particularly relates to a color filter substrate, a manufacturing method thereof, and a display panel.

BACKGROUND

The statements herein are intended for the mere purpose of providing background information related to the present application and do not necessarily constitute prior art.

With the development of display technology, peoples pursuit of the display quality of display devices is getting increasingly higher. For example, a narrow bezeled or even a bezel-less display screen has become one of the highlights of the display screen design. In the manufacturing process of a display device, the array substrate is usually fabricated independently in advance, and then the array substrate and the color filter substrate are aligned and bonded to form a liquid crystal cell. The black matrix on the color filter substrate corresponds to the positions of data lines, scan lines, thin film transistors, etc., on the array substrate, so as to shield the data lines, scan lines, thin film transistors, and so on.

The production cost of liquid crystal display is decreasing on a daily basis, and the manufacturing process is improving on a daily basis, and it has become the mainstream technology of fiat panel display. The liquid crystal display panel includes an array substrate, an opposite substrate and liquid crystal molecules therebetween. The non-display area on the periphery of the opposite substrate has a black matrix layer (BM) structure, which is used to prevent light leakage. Nowadays, the liquid crystal display market requires more products with a narrow or no bezel, thus reducing the length of the edge black matrix layer, which however will lead to light leakage and electrostatic accumulation damage, which will affect product quality.

SUMMARY

It is therefore a purpose of the present application to provide a color filter substrate, a manufacturing method thereof, and a display panel, which can improve the light leakage issue of the traditional black matrix and increase the antistatic capability of the display.

This application discloses a color filter substrate, including a substrate, a black matrix layer, a first groove, and a reflective layer. The black matrix layer is arranged on the substrate. The substrate includes a display area and a non-display area, and the non-display area is disposed around the display area. The black matrix layer is arranged on the substrate, and includes at least a first black matrix layer disposed in the display area and a second black matrix layer disposed in the non-display area. The first groove is defined in the second black matrix layer and is disposed around the display area. The reflective layer covers the first groove.

This application further discloses a method for manufacturing a color filter substrate, including:
 forming a black matrix layer on the substrate;
 defining a. first groove in the black matrix layer; and
 coating a reflective layer in the first groove;
 where the substrate includes a display area and a non-display area, and the non-display area is disposed around the display area; the reflective layer covers the first groove.

This application further discloses a display panel, including a color filter substrate and an array substrate aligned and bonded with the color filter substrate. The color filter substrate includes a substrate, a black matrix layer, a first groove and a reflective layer. The black matrix layer is arranged on the substrate. The substrate includes a display area and a non-display area, and the non-display area is disposed around the display area. The black matrix layer is arranged on the substrate, and includes at least a first black matrix layer arranged in the display area and a second black matrix layer formed in the non-display area. The first groove is defined in the second black matrix layer and is disposed around the display area; the reflective layer covers the first groove.

Compared with the solution of improving static electricity and light leakage by forming a through groove in the black matrix to cut off the black matrix, in the present application, the first groove penetrates through the black matrix layer, and the reflective layer is coated in the first groove, effectively increasing the shading effect of the edge black matrix (BM), and at the same time can reduce the length of the black matrix layer in the non-display area at the edge, thereby reducing the size of the non-display area and realizing a narrow bezel, and the reflective layer can effectively block static electricity from damaging the display device thus achieving an antistatic effect.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following, description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
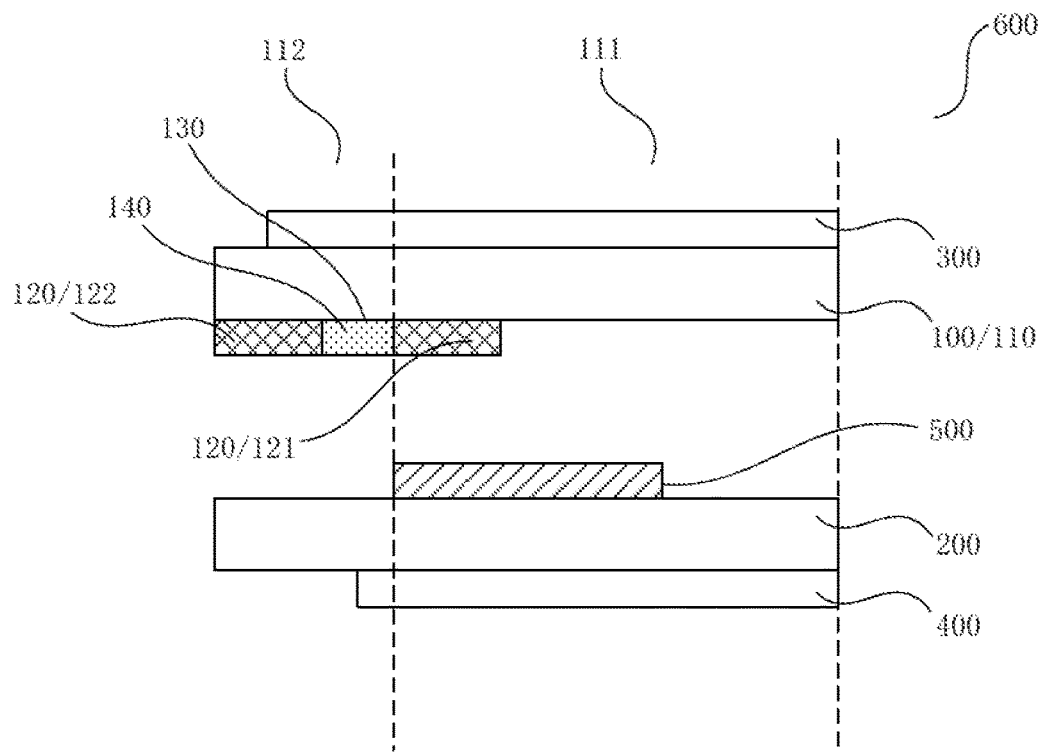
FIG. 1 is a schematic diagram of a display panel according to an embodiment of the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and: or combinations thereof may be present or added.

In addition, terms such as "center", "transverse", "lateral", "above", "on", "under", "below", "left", "right", "vertical", "horizontal", "top", "bottom", "inside", "outside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms "installed on", "connected to" and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this. application can be understood depending on specific contexts.

The present application will be described in detail below with reference to the accompanying drawings and optional embodiments. It should be noted that, should no conflict be present, the embodiments or technical features described below can be arbitrarily combined to form new embodiments.

As illustrated in FIG. 1, as an embodiment of the present application, a display panel 600 is disclosed. The display panel 600 includes a color filter substrate 100, an array substrate 200, an upper polarizer 300, a lower polarizer 400 and a liquid crystal 500. The color filter substrate 100 and the array substrate 200 are aligned and bonded with each other. The liquid crystal 500 is disposed between the color filter substrate 100 and the array substrate 200. The upper polarizer 300 is disposed on the side of the color filter substrate 100 away from the array substrate 200. The lower polarizer 400 is disposed on the side of the array substrate 200 away from the color filter substrate 100.

The color filter substrate 100 includes a substrate 110, a black matrix layer 120, a first groove 130 and a reflective layer 140. The black matrix layer 120 is disposed on the substrate 110. The first groove 130 penetrates through the black matrix layer 120. The first groove 130 may be understood as a through groove dug in the black matrix layer 120. The reflective layer 140 covers the first groove 130, where part or entirety of the reflective layer 140 is disposed in the first groove 130. The first groove 130 may also be regarded as being created by performing annular grooving in the black matrix layer 120, and the antistatic effect of the black matrix layer 120 can be improved by grooving. The reflective layer 140 is coated in the first groove 130. The reflective material of the reflective layer 140 may be a substance with ultra-high reflectivity (such as Nano-titanium dioxide). The reflective layer 140 reflects the light emitted by the backlight source to improve the light leakage issue of the traditional black matrix. In the present application, by coating the reflective layer 140 in the first groove 130, it is very effective to improve the light leakage issue and anti-static capability, and can also reduce the edge length of the black matrix layer 120, thereby realizing a narrow bezel.

The substrate 110 includes a display area 111 and a non-display area 112, and the non-display area 112 is disposed around the display area 111. The black matrix layer 120 includes a first black matrix layer 121 and a second black matrix layer 122, the first black matrix layer 121 is formed in the display area 111; the second black matrix layer 122 is formed in the non-display area 112. The first groove 130 is disposed between the first black matrix layer 121 and the second black matrix layer 122. The first groove 130 is disposed around the display area 111. The first black matrix layer 121 is also disposed around the display area. Therefore, the first groove 130 surrounds the display area 111 and also surrounds the first black matrix layer 121. The second black matrix layer 122 surrounds the first groove 130. The first groove 130 is created by digging a groove in the side of the black matrix layer 120 adjacent to the display area 111, and a reflective layer 140 is coated in the first groove 130 to reflect the light emitted by the backlight source, improving the light leakage effect of the traditional black matrix, thereby reducing the width of the black matrix and realizing a narrower bezel of the LCD display. Meanwhile, the black matrix layer 120 is generally made of resin, which is easy to accumulate static electricity, and the reflective layer 140 increases the antistatic capability of the display device.

Generally, the thickness of the first black matrix layer 121 and the thickness of the second black matrix layer 122 are equal; of course, they may not be equal. The thickness of the reflective layer 140 is related to the thickness of the second black matrix layer 122. The thickness of the reflective layer 140 may be equal to the thickness of the second black matrix 122, or may be smaller than the thickness of the second black matrix layer 122, and of course may be greater than the thickness of the second black matrix 122, namely the thickness of the reflective layer 140 can be adjusted depending on the process requirements. After the reflective layer 140 is added, the overall structure of the black matrix layer 120 plus the reflective layer 140 is shorter than the original. Generally, the BM width of the product is 2000-10000 μm depending on different sizes of products), which can be shortened proportionally. The reflective layer 140 accounts for about 10-20% of the entire structure. The overall width can be reduced by 10-60% compared to the original, achieving the effect of narrow bezels to a large extent.

Figure 2:
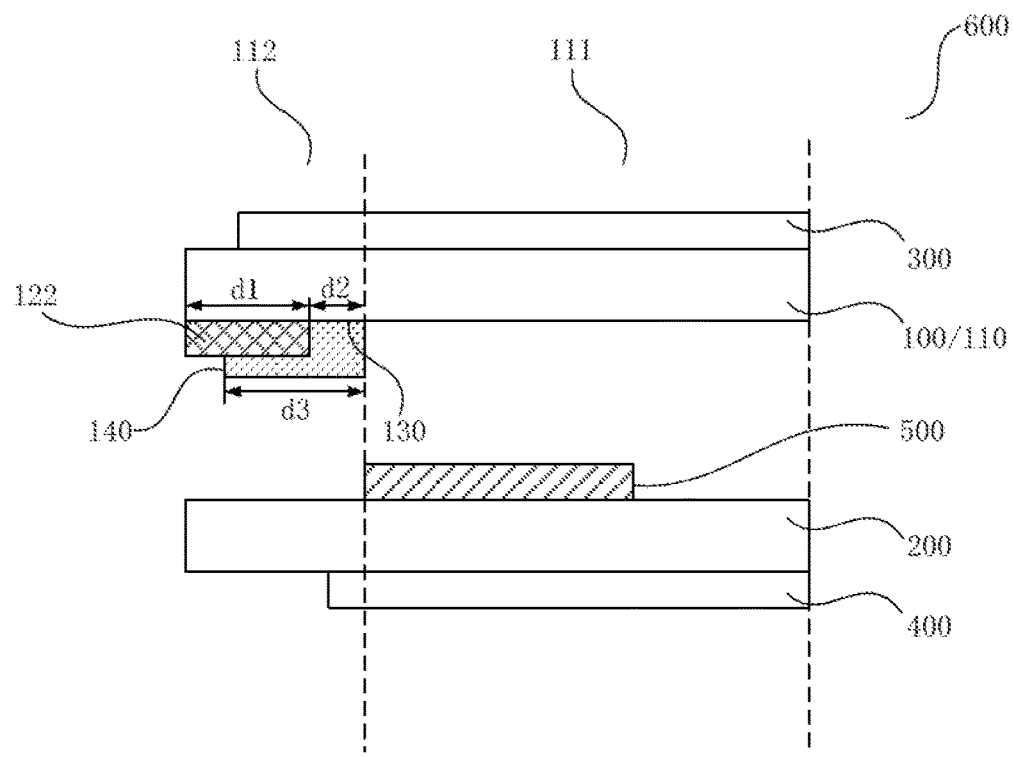
FIG. 2 is a schematic diagram of a display panel according to another embodiment of the present application.

As illustrated in FIG. 2, in the direction of the first groove 130 along the second black matrix layer 122, the length of the reflective layer 140 is greater than the length of the first groove 130. The length of the reflective layer 140 is the distance from the end of the reflective layer 140 adjacent to the display area 111 to the end of the reflective layer 140 away from the display area 111. The length of the first groove 130 is the distance from the end of the first groove 130 adjacent to the display area 111 to the end of the first groove 130 away from the display area 111. Taking FIG. 2 as an example for illustration, the length of the second black matrix layer 122 is d1, the length of the first groove 130 is d2, and the length of the reflective layer 140 is d3. As an embodiment of the present application, different from the above-mentioned embodiments, the length d3 of the reflective layer 140 is greater than the length d2 of the first groove 130, so that when the reflective layer 140 is coated, not only can the reflective layer 140 cover the first groove 130, it can also cover the side of the second black matrix layer 122 adjacent to the first groove 130 to prevent light leakage at the side of the second black matrix adjacent to the first groove 130. The side of the second black matrix layer 122 away from the first groove 130 lies on the same straight line as the edge of the substrate 110. One side of the reflective layer 140 coincides with the side of the first groove 130 adjacent to the display area 111. The other side of the reflective layer 140 is disposed between the two sides of the second black matrix layer 122.

Figure 3:
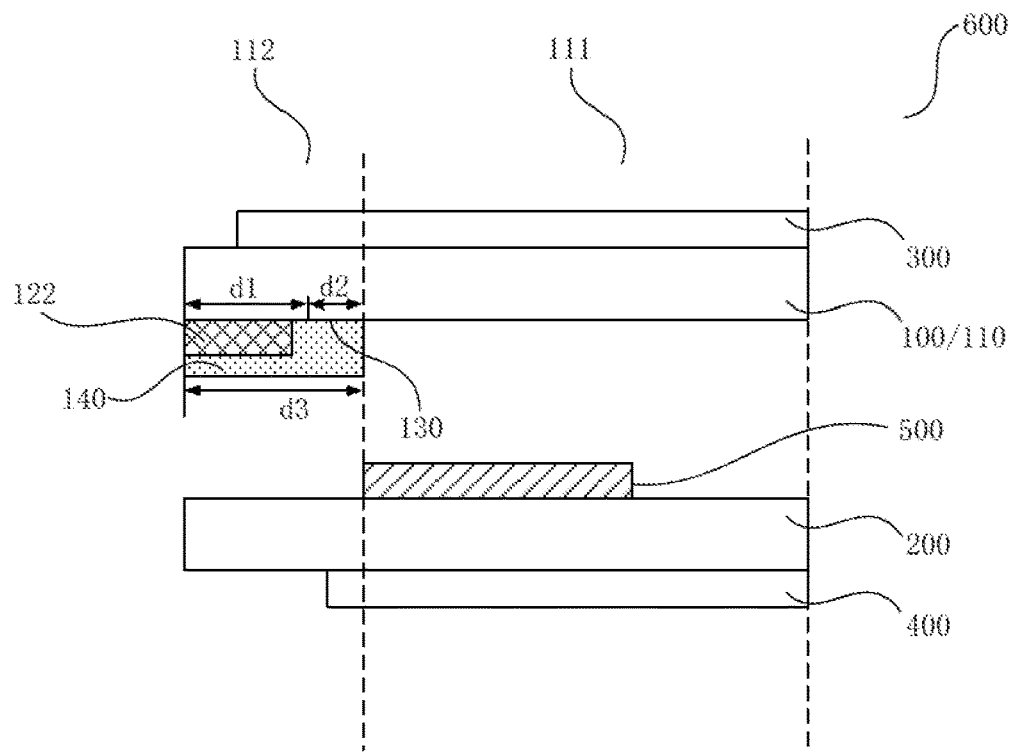
FIG. 3 is a schematic diagram of a display panel according to yet another embodiment of the present application.

As illustrated in FIG. 3, as another embodiment of the present application, different from the above-mentioned embodiments, in the direction of the first groove 130 along the second black matrix layer 122, the length of the reflective layer 140 is equal to the sum of the lengths of the first groove 130 and the second black matrix layer 122. The length of the reflective layer 140 is the distance from the end of the reflective layer 140 adjacent to the display area 111 to the end of the reflective layer 140 away from the display area 111. The length of the first groove 130 is the distance from the end of the first groove 130 adjacent to the display area 111 to the end of the first groove 130 away from the display area 111. The length of the second black matrix layer 122 is the distance from the end of the second black matrix layer 122 adjacent to the display area ill to the end of the second black matrix layer 122 away from the display area 111. Taking FIG. 3 as an example for illustration, the length d3 of the reflective layer 140 is equal to the sum of the length d2 of the first groove 130 and the length d1 of the second black matrix layer 122. The side of the second black matrix layer 122 away from the first groove 130 lies on the same line as the edge of the substrate 110. One side of the reflective layer 140 coincides with the side of the first groove 130 adjacent to the display area 111. The other side of the reflective layer 140 lies on the same line as the side of the second black matrix layer 122 away from the first groove 130 and the edge of the substrate 110. The reflective layer 140 is coated on the top of the black matrix and on the side adjacent to the display area 111, and can reflect light from the backlight horizontally; vertically and at any angle, thereby increasing the shading effect of the non-display area 112, thereby reducing the width of the black matrix, realizing a narrower bezel of the LCD display, and enhancing, the antistatic capability.

Figure 4:
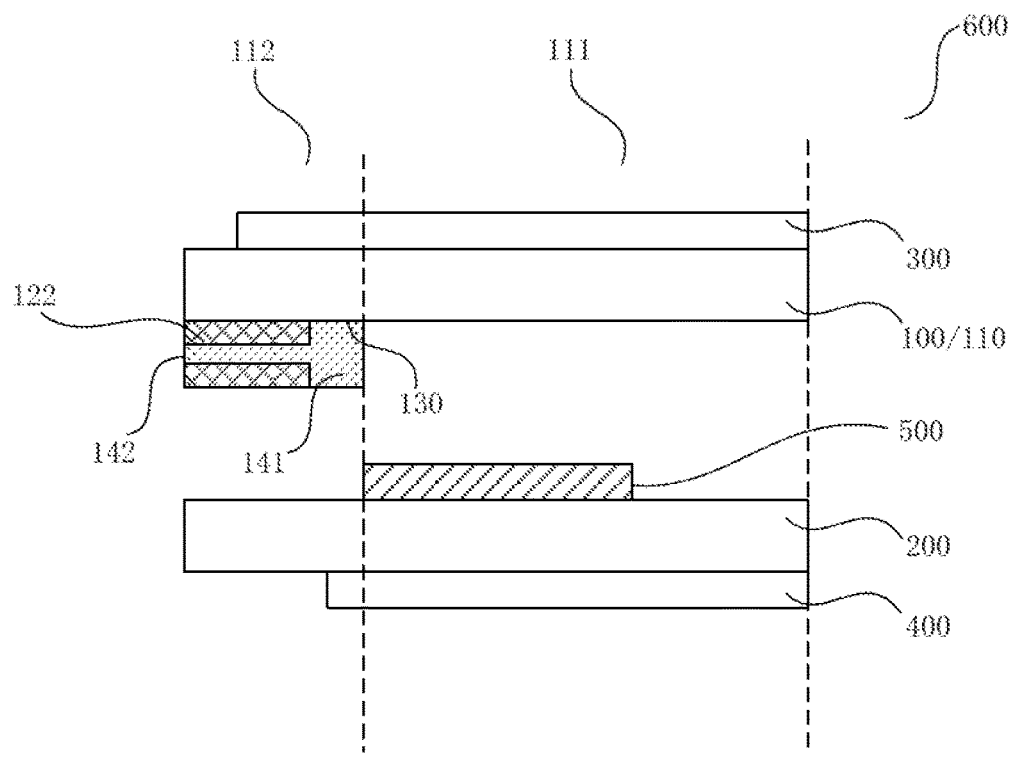
FIG. 4 is a schematic diagram of a display panel according to still another embodiment of the present application.

As illustrated in FIG. 4, as another embodiment of the present application, different from the above-mentioned embodiments, the reflective layer 140 includes a first reflective layer 141 and a second reflective layer 142, where the first reflective layer 141 is disposed in the first groove 130, the second reflective layer 142 is disposed in the second black matrix layer 122. The first reflective layer 141 and the second reflective layer 142 are integrally formed. The black matrix absorbs the light missed by the reflective layer 140, and at the same time prevents the external light from being reflected to cause the visual perception of light leakage, and reduces the external light reflected by the reflective layer, thereby reducing the backlight leakage. In the direction of the first groove along the second black matrix layer, the length of the second reflective layer 142 may be equal to the length of the second black matrix layer 122, and certainly may be smaller than the length of the second black matrix layer 122. The OD (optical density) value of the light. shielding density of the conventional black matrix is constant. If a reflective layer 140 is added to the second black matrix layer 122, the shielding effect can be greatly improved, thereby reducing the length of the black matrix layer and realizing a narrower bezel of the LCD display.

Figure 5:
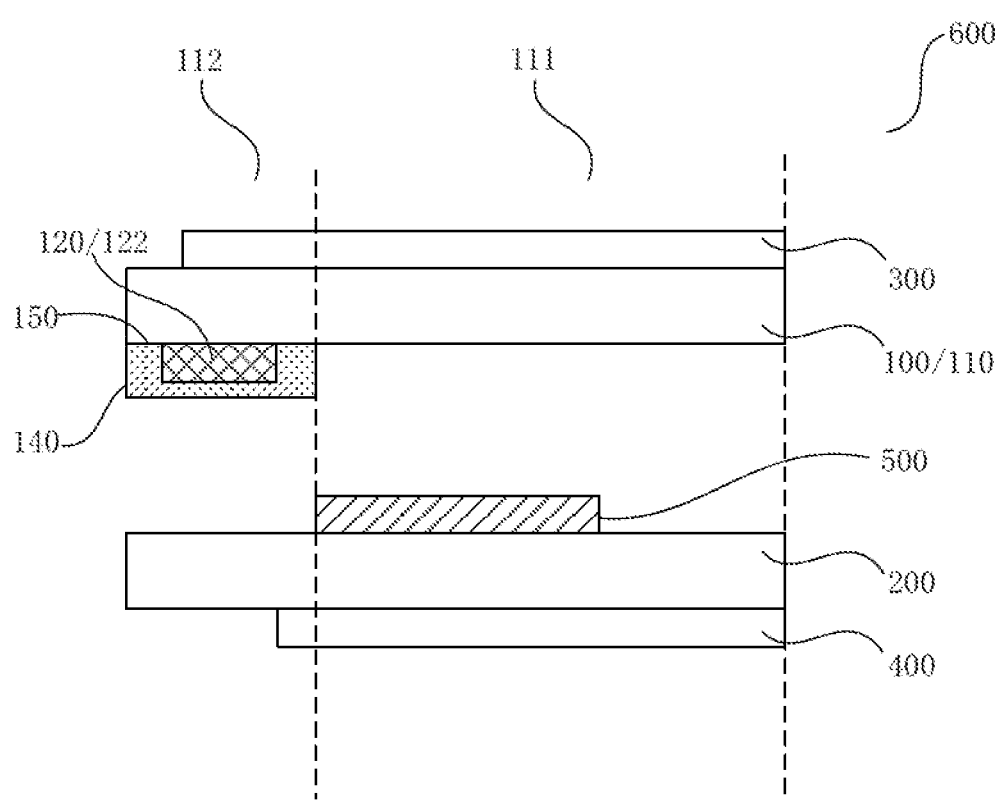
FIG. 5 is a schematic diagram of a display panel according to still another embodiment of the present application.
Figure 6:
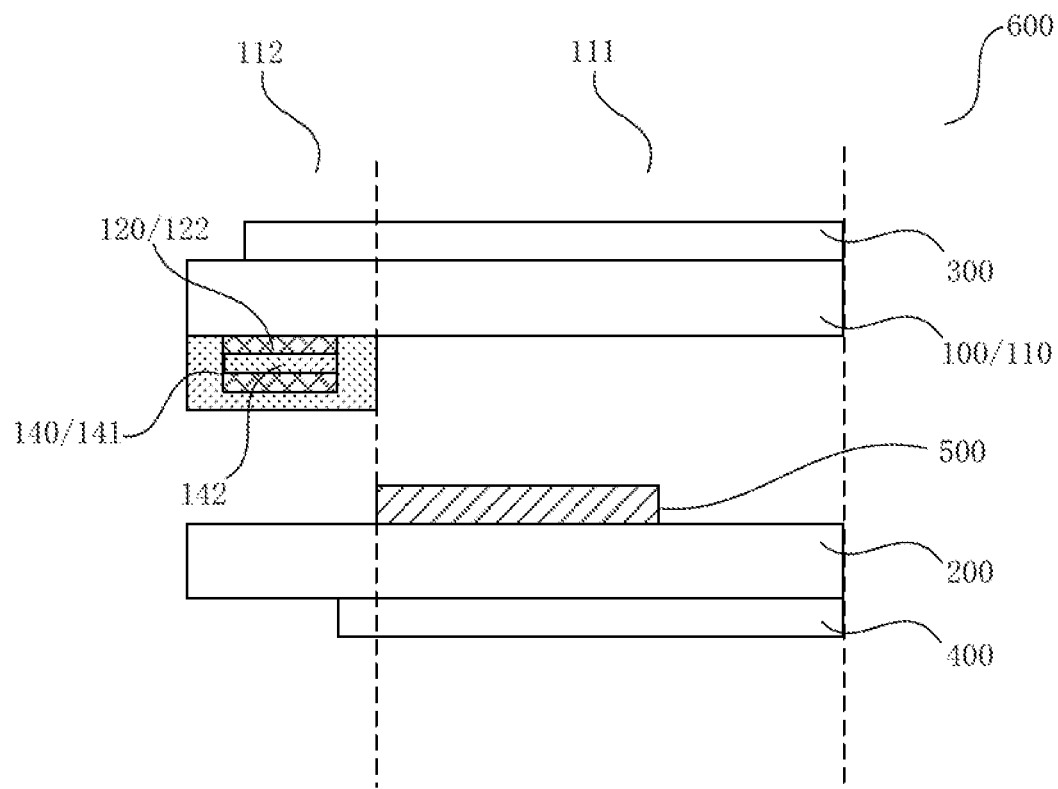
FIG. 6 is a schematic diagram of a display panel according to still another embodiment of the present application.

As illustrated in FIG. 5, as another embodiment of the present application, different from the above embodiments, the color filter substrate 100 further includes a second groove 150, and the second groove 150 surrounds the second black matrix layer 122. Typically, in the direction of the first groove along the second black matrix layer, the length of the reflective layer 140 is equal to the sum of the length of the first groove 130, the length of the second black matrix layer 122 and the length of the second groove 150, meaning the reflective layer 140 completely covers the second black matrix layer 122, which not only prevents light leakage from the side of the black matrix, but also enhances the reflectivity. When the reflective layer 140 is coated, one side of the reflective layer 140 coincides with the side of the first groove 130 adjacent to the display area 111. The other side of the reflective layer 140 coincides with the side of the second groove 150 away from the second black matrix layer 122. The side of the second groove 150 away from the second black matrix layer 122 is on the same line as the side of the substrate 110 and the side of the reflective layer 140 away from the display area 111. Further, as illustrated in FIG. 6, a second reflective layer 142 is disposed in the second black matrix layer 122, which can not only reduce the reflection of external light by the reflective layer, but also reduce the light leakage of the backlight.

Figure 7:
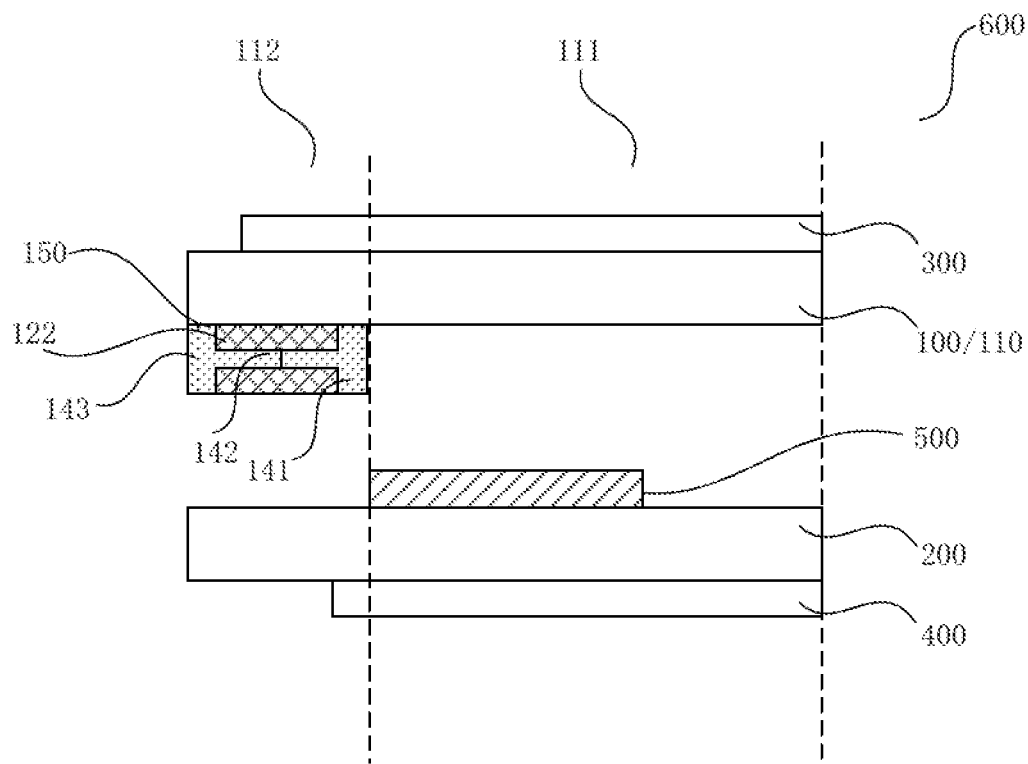
FIG. 7 is a schematic diagram of a display panel according to still another embodiment of the present application.

As illustrated in FIG. 7, as another embodiment of the present application, different from the above-mentioned embodiments, the color filter substrate 100 further includes a second groove 150, and the second groove 150 surrounds the second black matrix layer 122. The reflective layer 140 includes a first reflective layer 141, a second reflective layer 142 and a third reflective layer 143, where the first reflective layer 141 is arranged in the first groove 130, the second reflective layer 142 is arranged in the second black matrix layer 122, the third reflective layer 143 is disposed in the second groove 150. The first reflective layer, the second reflective layer 142 and the third reflective layer 143 are integrally formed, which can not only reduce the reflection of external light by the reflective layer, but also reduce the light leakage of the backlight.

Figure 8:
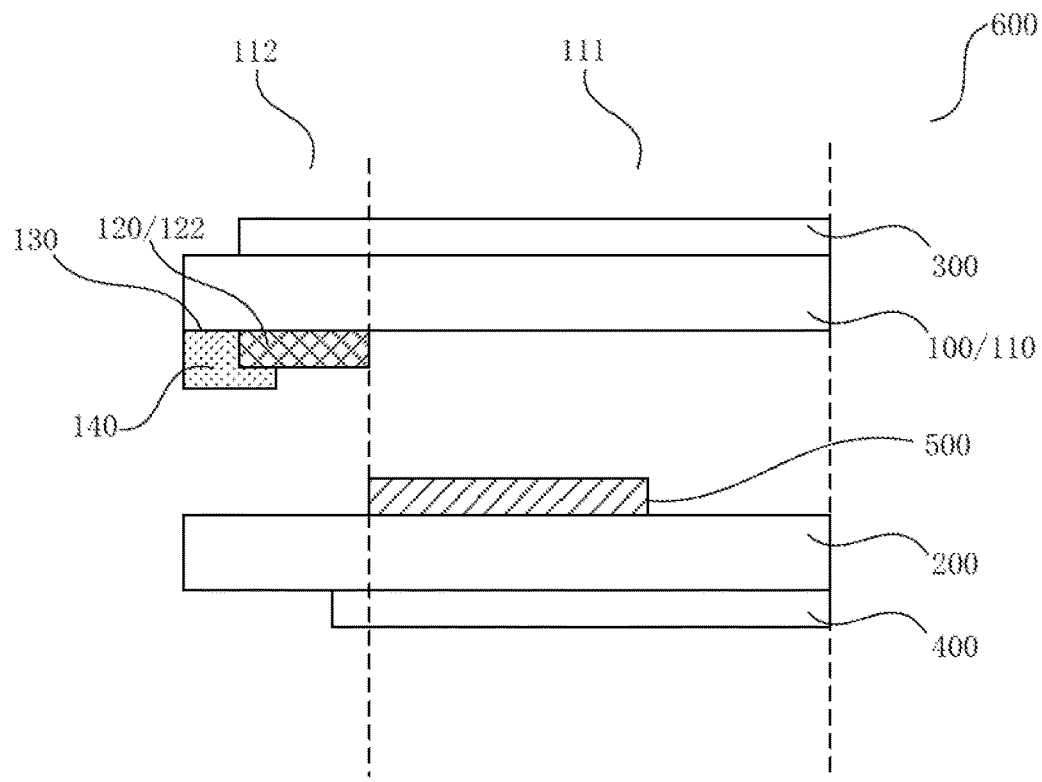
FIG. 8 is a schematic diagram of a display panel according to still another embodiment of the present application.

As illustrated in FIG. 8, as another embodiment of the present application, different from the above-mentioned embodiments, the first groove 130 is arranged on the edge of the black matrix layer 120. The first groove 130 is arranged around the second black matrix layer 122 in the non-display area 112, and the second black matrix layer 122 is arranged around the display area 111, and the first black matrix layer is also arranged around the display area, so the second black matrix layer surrounds the first black matrix layer while surrounding the display area. In the direction of the first groove along the second black matrix layer, the length of the reflective layer 140 is greater than the length of the first groove 130. When the reflective layer 140 is coated, not only the first groove 130 can be covered, but also the side of the second black matrix layer 122 adjacent to the first groove 130 to prevent light leakage at the side of the second black matrix adjacent to the first groove 130. One side of the reflective layer 140 coincides with the side of the first groove 130 adjacent to the display area 111 and lies on the same line as the edge of the substrate 110, and the other side of the reflective layer 140 is located between the two sides of the second black matrix layer 122.

Figure 9:
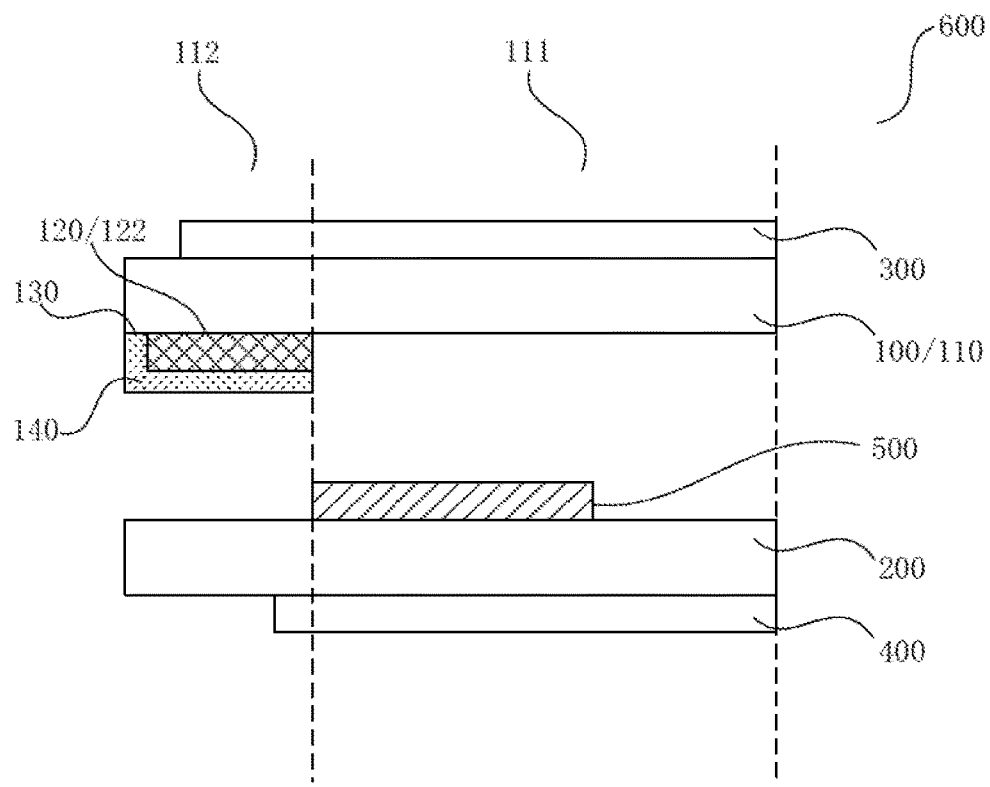
FIG. 9 is a schematic diagram of a display panel according to still another embodiment of the present application.

As illustrated in FIG. 9, in the direction of the first groove along the second black matrix layer, the length of the reflective layer 140 is equal to the sum of the length of the first groove 130 and the length of the second black matrix layer 122. The side of the second black matrix layer 122 away from the first groove 130 lies on the same line as the edge of the substrate 110. One side of the reflective layer 140 coincides with the side of the first groove 130 adjacent to the display area 111. The other side of the reflective layer 140 lies on the same line as one side of the first groove 130 and the edge of the substrate 110. The reflective layer 140 is coated on the top of the black matrix and on the side close to the display area 111, and can reflect light from the backlight horizontally, vertically and at any angle, increasing the shading effect of the non-display area 112, thereby reducing the length of the black matrix layer and realizing a narrower bezel of the LCD display screen, and enhancing the antistatic capability.

Figure 10:
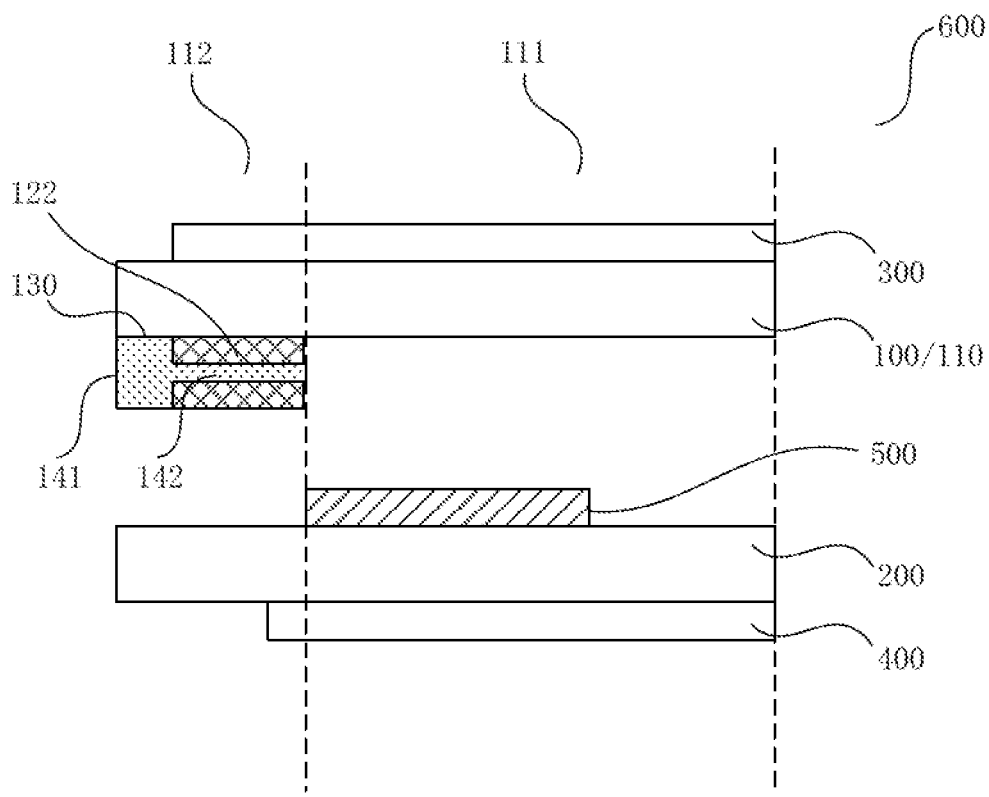
FIG. 10 is a schematic diagram of a display panel according to still another embodiment of the present application.

As illustrated in FIG. 10, the reflective layer 140 includes a first reflective layer 141 and a second reflective layer 142, where the first reflective layer 141 is arranged in the first groove 130, and the second reflective layer 142 is arranged in the second black matrix layer 122. The first reflective layer 141 and the second reflective layer 142 are integrally formed, which can not only reduce the reflection of external light by the reflective layer, but also reduce the light leakage of the backlight. In the direction of the first groove 130 along the second black matrix layer 122, the length of the second reflective layer 142 may be equal to the length of the second black matrix layer 122, and of course may be smaller than the length of the length of the second black matrix layer 122.

In any of the above-mentioned embodiments, the overall thickness of the reflective layer 140 and the second black matrix layer 1.22 is equal to the thickness of the first black matrix layer 121, of course, they can also be unequal. The sum of the thickness of the reflective layer 140 and the thickness of the second black matrix layer 122 is greater than the thickness of the first black matrix layer 121, which can effectively increase the shading effect of the edge black matrix (BM) and reduce the width of the black matrix in the edge non-display area 112. Thereby, the size of the non-display area 112 is reduced, and a narrow bezel is realized. The reflective layer 140 can effectively block static electricity from damaging the display device and serve an antistatic effect.

In any of the above embodiments, the lengths mentioned are those in the horizontal direction as shown in the figures. For example, the length of the first groove refers to the distance from the end of the first groove adjacent to the display area to the end of the groove adjacent to the non-display area, and the length of the reflective layer refers to the distance from the end of the reflective layer adjacent to the display area to the end of the reflective layer away from the display area.

Figure 11:
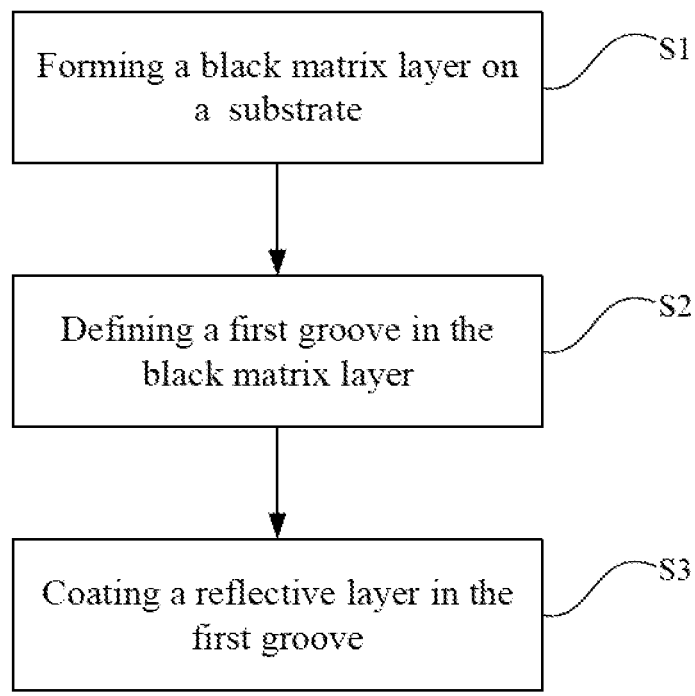
FIG. 11 is a schematic flowchart of a method for fabricating a color filter substrate according to still another embodiment of the present application.

As illustrated in FIG. 11, as another embodiment of the present application, a method for manufacturing a color filter substrate is disclosed, including:

S1: forming a black matrix layer on a substrate;
S2: defining a first groove in the black matrix layer; and
S3: coating a reflective layer in the first groove.

By coating the reflective layer in the first groove, the shading effect of the edge black matrix layer can be effectively increased, and at the same time, the width of the black matrix in the non-display area at the edge can be reduced, thereby reducing the size of the non-display area and realizing a narrow bezel. The reflective layer can effectively block static electricity from damaging the display device and play an antistatic effect.

As another embodiment of the present application, different from the above manufacturing method, a second groove is also defined in the black matrix layer; the reflective layer is coated both into the first groove and the second groove.

The black matrix layer includes a first black matrix layer and a second black matrix layer, the first black matrix layer is formed in the display area; the second black matrix layer is formed in the non-display area. The first grove is arranged between the first black matrix layer and the second black matrix layer; that is, the first groove is arranged around the display area. The second black matrix layer is arranged around the first groove, and the second groove is arranged around the second black matrix layer. In the direction of the first groove along the second black matrix layer, the length of the reflective layer is equal to the sum of the lengths of the first groove, the second black matrix layer and the second groove, so that the reflective layer completely covers the second black matrix layer. When the reflective layer is coated, one side of the reflective layer coincides with the side of the first groove adjacent to the display area, and the other side of the reflective layer coincides with the side of the second groove away from the second black matrix layer. The side of the second groove away from the second black matrix layer lies on the same line as the side of the substrate and the side of the reflective layer away from the display area, which not only prevents light leakage from the side of the black matrix, but also enhances reflectivity to achieve narrow bezels.

It should be noted that the description of various steps involved in this solution are not to be construed as limiting the order of steps, if the implementation of the specific solution is not affected. That is, the steps written in earlier can be performed before, or after, or even at the same time as those written later. As long as this solution can be implemented, any order of the steps should be regarded as falling in the scope of protection of this application.

The technical solutions of the present application may be widely used in various display panels, such as TN (Twisted Nematic) display panels. IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A color filter substrate, comprising:
   a substrate, comprising a display area and a non-display area, the non-display area being disposed surrounding the display area;
   a black matrix layer, arranged on the substrate and comprising at least a first black matrix layer disposed in the display area and a second black matrix layer formed in the non-display area;
   a first groove, disposed in the second black matrix layer and surrounding the display area; and
   a reflective layer, covering the first groove.

2. The color filter substrate of claim 1, wherein the first groove is disposed to surround a side of the second black matrix layer adjacent to the display area, and the first groove is disposed between the first black matrix layer and the second black matrix layer.

3. The color filter substrate of claim 2, wherein in a direction of the first groove along the second black matrix layer, a length of the reflective layer is greater than a length of the first groove;
   wherein the length of the reflective layer is a distance from an end of the reflective layer adjacent to the display area to an end of the reflective layer away from the display area;
   and the length of the first groove is a distance from an end of the first groove adjacent to the display area to an end of the first groove away from the display area.

4. The color filter substrate of claim 2, wherein in a direction of the first groove along the second black matrix layer, a length of the reflective layer is equal to a sum of lengths of the first groove and the second black matrix layer;
   wherein the length of the reflective layer is a distance from an end of the reflective layer adjacent to the display area to an end of the reflective layer away from the display area;
   the length of the first groove is a distance from an end of the first groove adjacent to the display area to an end of the first groove away from the display area.
   and the length of the second black matrix layer is a distance from an end of the second black matrix layer adjacent to the display area to an end of the second black matrix layer away from the display area.

5. The color filter substrate of claim 2, further comprising a second groove disposed surrounding the second black matrix layer, and wherein in a direction of the first groove along the second black matrix layer, a length of the reflective layer is equal to a sum of lengths of the first groove, the second black matrix layer and the second groove.

6. The color filter substrate of claim 2, wherein the reflective layer comprises a first reflective layer and a second reflective layer, wherein the first reflective layer is arranged in the first groove, and the second reflective layer is arranged in the second black matrix layer.

7. The color filter substrate of claim 2, wherein in a direction of the first groove along the second black matrix layer, a length of the reflective layer is equal to a length of the first groove;
   wherein the length of the reflective layer is a distance from an end of the reflective layer adjacent to the display area to an end of the reflective layer away from the display area;
   and the length of the first groove is a distance from an end of the first groove adjacent to the display area to an end of the first groove away from the display area.

8. The color filter substrate of claim 5, wherein the reflective layer comprises a first reflective layer and a second reflective layer, wherein the first reflective layer is disposed in the first groove, the second black matrix layer and the second groove, and wherein the second reflective layer is arranged in the second black matrix layer.

9. The color filter substrate of claim 5, Wherein the reflective layer comprises a first reflective layer and a second reflective layer, wherein the first reflective layer is arranged in the first groove and the second groove, and wherein the second reflective layer is arranged in the second black matrix layer.

10. The color filter substrate of claim 5, wherein an overall thickness of the reflective layer and the second black matrix is equal to a thickness of the first black matrix layer.

11. The color filter substrate of claim 1, wherein the first groove is disposed surrounding a side of the second black matrix layer away from the display area.

12. The color filter substrate of claim 11, wherein the reflective layer comprises a first reflective layer and a second reflective layer, wherein the first reflective layer is arranged in the first groove, and the second reflective layer is arranged in the second black matrix layer.

13. The color filter substrate of claim 11, wherein in a direction of the first groove along the second black matrix layer, a length of the reflective layer is equal to a sum of lengths of the first groove and the second black matrix layer;
   wherein the length of the reflective layer is a distance from an end of the reflective layer adjacent to the display area to an end of the reflective layer away from the display area;
   the length of the first groove is a distance from an end of the first groove adjacent to the display area to an end of the first groove away from the display area.
   and the length of the second black matrix layer is a distance from an end of the second black matrix layer adjacent to the display area to an end of the second black matrix layer away from the display area.

14. The color filter substrate of claim 12, wherein the first black matrix layer and the second black matrix layer are integrally formed.

15. A method for manufacturing a color filter substrate, comprising:
   forming a black matrix layer on a substrate;
   defining a first groove in the black matrix layer; and
   coating a reflective layer in the first groove;
   wherein the substrate comprises a display area and a non-display area disposed around the display area, and wherein the reflective layer covers the first groove.

16. The method of claim 15, wherein the black matrix layer comprises at least a first black matrix layer disposed in the display area and a second black matrix layer formed in the non-display area;
   wherein the first groove is arranged in the second black matrix layer and is arranged surrounding the display area; the first groove is arranged surrounding a side of the second black matrix layer adjacent to the display area, and wherein the first groove is disposed between the first black matrix layer and the second black matrix layer;

wherein the reflective layer comprises a first reflective layer and a second reflective layer, the first reflective layer being arranged in the first groove, and the second reflective layer being arranged in the second black matrix layer.

17. The method of claim 15, wherein the black matrix layer comprises at least a first black matrix layer disposed in the display area and a second black matrix layer formed in the non-display area;
 wherein the first groove is arranged in the second black matrix layer and is arranged surrounding the display area; the first groove is arranged surrounding a side of the second black matrix layer away from the display area;
 wherein the reflective layer comprises a first reflective layer and a second reflective layer, the first reflective layer being arranged in the first groove, and the second reflective layer being arranged in the second black matrix layer.

18. A display panel, comprising a color filter substrate and an array substrate, which are aligned and bonded together, wherein the color filter substrate comprises:
 a substrate, comprising a display area and a non-display area, the non-display area being arranged surrounding the display area;
 a black matrix layer, arranged on the substrate and comprising at least a first black matrix layer disposed in the display area and a second black matrix layer formed in the non-display area;
 a first groove, defined in the second black matrix layer and surrounding the display area; and
 a reflective layer, covering the first groove.

19. The display panel of claim 18, wherein the first groove is disposed to surround a side of the second black matrix layer adjacent to the display area, and the first groove is disposed between the first black matrix layer and the second black matrix;
 wherein the reflective layer comprises a first reflective layer and a second reflective layer, the first reflective layer being arranged in the first groove, and the second reflective layer being arranged in the second black matrix layer;
 wherein an overall thickness of the second reflective layer and the second black matrix layer is equal to a thickness of the first reflective layer.

20. The display panel of claim 18, wherein the first groove is disposed surrounding a side of the second black matrix layer away from the display;
 wherein the reflective layer comprises a first reflective layer and a second reflective layer, the first reflective layer being arranged in the first groove, and the second reflective layer being arranged in the second black matrix layer;
 wherein a side of the first reflective layer away from the display area lies on a same straight line as an edge of the substrate.

\* \* \* \* \*